Patented Mar. 1, 1927.

1,619,666

UNITED STATES PATENT OFFICE.

ROBERT GANSSEN, OF GRUNEWALD, GERMANY.

PROCESS FOR THE EXTRACTION OF AMMONIUM-ALUMINUM SULPHATE FROM ALUMINUM-SULPHATE SOLUTIONS CONTAINING FERRIC COMPOUNDS.

No Drawing. Application filed February 14, 1921, Serial No. 444,994, and in Germany September 21, 1917.
Renewed December 11, 1926.

For the purpose of extracting pure alumina from an aluminum sulphate solution containing ferric-compound, different processes have been suggested. The ordinary method consists in extracting the aluminum oxide in the form of alum, after the addition of sulphate of potassium or sulphate of ammonium, sometimes after the reduction of the ferric-compounds to ferro-compounds for instance ferric-sulphate to ferro-sulphate. This alum, however, is seldom sufficiently free of iron, so that the necessity arises to submit the alum, once or several times, to a process of recrystallization. The reduction of the ferric-compounds and the process of recrystallization, however, quite apart from the expense and the large apparatus, entail a considerable increase in the time required for the operation of the process.

These disadvantages are avoided and an alum sufficiently free of iron, is directly obtained by the new process in the operation of which I preferably proceed as follows: To a solution of aluminum sulphate containing a ferric-compound, as for instance, ferric-sulphate which is obtained by acting upon argillaceous rocks with sulphuric acid, sulphates (as ammonium-sulphate or bi-sulphates, an excess of sulphate of ammonium is added. There is added, for instance, to 100 cc. of a solution of 50%

$$Al_2(SO_4)_3 \cdot 18H_2O$$

and 3%

$$Fe_2(SO_4)_3,$$

about 15–30 grammes of sulphate of ammonium, that is, more than required to form ammonium alum from sulphate of alumina. The excess of ammonium sulphate depends upon the quantity of the ferric-sulphate present and increases the yield of alum. The solution is subsequently combined with such large quantities of a base, that after the crystallization of the ammonium alum, which is allowed to take place under cooling and disturbing the crystallizing process, the ferric-sulphate remaining in solution is converted into basic ferric-sulphate. An excess of sulphate of ammonium is likewise required, to preserve the ferric-sulphate in solution. The basic ferric-sulphate renders the conversion of iron into alum much more difficult than normal or acid ferric-sulphate. By disturbing the process of crystallization by agitating, or cooling, or simultaneously agitating and cooling the solution, there are small crystals produced which is preferable because large crystals absorb a greater percentage of iron.

The alum is then washed with a solution of sulphate of ammonium and the content of iron of the alum thus obtained is considerably less than 0.1% if based on the content of $Al_2O_3$ in the alum. This limit of 0.1% should not be exceeded if the alum is transformed into aluminum oxide for the purpose of making metallic aluminum therefrom.

The first washing of the alum can, after the precipitation of the iron, be taken back to the process; the subsequent washing may be used direct for that purpose.

As evidence, that disturbing the crystallization process while cooling, an excess of sulphate of ammonium, and especially, transforming the ferric sulphate into basic ferric sulphate, will result in the above-mentioned effect, the following examples may be cited:

The solutions employed contained approximately 7.5% $Al_2O_3$ and about 1.2% $Fe_2O_3$ in a sulphuric acid solution. Computed on the basis of alumina, there was, therefore, 16% of ferric oxides.

I$^a$. The normal hot solutions (100 cub. cm.) yielded, with the addition of 10 g. $(NH_4)_2SO_4$, which represents the necessary quantity for the formation of alum, without disturbing the crystallization process a large crystal of alum, which produced alumina containing 3% of iron; when adding under the same conditions 30 g. $(NH_4)_2SO_4$, the yield was an alum containing 2.5% of iron.

I$^b$. When allowing the normal hot solution to crystallize while disturbing the crystallizing process, the alumina obtained from the small crystals of alum contained, when adding 10 g. $(NH_4)_2SO_4$, 0.8% of iron; while, when adding 30 g. $(NH_4)_2SO_4$ it contained only 0.3–0.35% of iron.

II. Acid hot solutions of sulphate of aluminum when disturbing the crystallizing process with the addition of 10 g. $(NH_4)_2SO_4$, yielded 0.7% of iron, and when adding 30 g. $(NH_4)_2SO_4$, 0.5% of iron, as computed on the basis of alumina.

III. Hot solutions in which the ferric sulphate was transformed into basic ferric sulphate, on the other hand, yielded when disturbing the crystallizing process and with the addition of 2.6 to 5.2 c. cm. and more of ammonia, having a strength of 10%, (according to the percentage of iron of the solutions and their acidity) for every 100 cub. cm. of the above solution with an addition of 30 g. $(NH_4)_2SO_4$ 0.04–0.06% of iron (as computed on the basis of alumina), while with an addition of only 10 g. $(NH_4)_2SO_4$, especially with a stronger basicity of the ferric-sulphate, a precipitation of basic ferric-sulphate was very liable to take place.

The excess of $(NH_4)_2SO_4$ is therefore, highly essential for the remaining in solution of basic ferric-sulphate.

As this process is worked with an excess of ammonium sulphate, the replacement of the ammonia by other bases is of no consequence, as in this case the other bases will combine with the sulphate of ammonium to neutral compounds and produce free ammonia.

Equally favourable results are obtained with the above examples under equal conditions and by the equivalent substitution of other bases for the free ammonia.

I claim—

1. The method of extracting ammonium-aluminum sulphate, substantially free of iron, from aluminum sulphate solutions containing ferric sulphate, said method consisting in acting upon said solution of aluminum sulphate with an excess of ammonium sulphate and adding a base in such a quantity as to convert the ferric sulphate, present in the solution, into a soluble basic ferric sulphate before the ammonium-aluminum sulphate crystallizes out.

2. The method of extracting ammonium-aluminum sulphate, substantially free of iron, from aluminum sulphate solutions containing ferric sulphate, said method consisting in acting upon said solution of aluminum sulphate with an excess of ammonium sulphate and adding ammonia in such a quantity as to convert the ferric sulphate, present in the solution, into a soluble basic ferric sulphate before the ammonium-aluminum sulphate crystallizes out.

3. The method of extracting ammonium-aluminum sulphate, substantially free of iron, from aluminum sulphate solutions containing ferric sulphate, said method consisting in acting upon said solution of aluminum sulphate with an excess of ammonium sulphate, adding a base in such a quantity as to convert the ferric sulphate, present in the solution, into a soluble basic ferric sulphate before the ammonium-aluminum sulphate crystallizes out, and accelerating the crystallization process so as to produce small crystals.

In testimony whereof, I have signed my name to this specification.

ROBERT GANSSEN.
(*Formerly Robert Gans.*)